United States Patent
Kim et al.

(10) Patent No.: US 8,116,753 B2
(45) Date of Patent: Feb. 14, 2012

(54) MOBILE TERMINAL AND METHOD FOR PLAYING MULTIMEDIA OBJECTS

(75) Inventors: Jong Hwan Kim, Suwon-si (KR); Dong Il Chang, Seoul (KR); Deung Ku Kang, Gunpo-si (KR)

(73) Assignee: LG Electronics Inc., Seoul (KR)

(*) Notice: Subject to any disclaimer, the term of this patent is extended or adjusted under 35 U.S.C. 154(b) by 264 days.

(21) Appl. No.: 12/480,233

(22) Filed: Jun. 8, 2009

(65) Prior Publication Data

US 2010/0056115 A1 Mar. 4, 2010

(30) Foreign Application Priority Data

Aug. 28, 2008 (KR) .................. 10-2008-0084372

(51) Int. Cl.
H04M 3/00 (2006.01)

(52) U.S. Cl. .................. 455/418; 455/414.1; 455/414.2; 455/414.4; 455/419; 455/500

(58) Field of Classification Search ............... 455/414.1, 455/414.2, 414.4, 418, 500; 715/200–208, 715/716–732, 864, 866
See application file for complete search history.

(56) References Cited

U.S. PATENT DOCUMENTS

2006/0036610 A1 2/2006 Wang

FOREIGN PATENT DOCUMENTS

| WO | WO-02/47467 A2 | 6/2002 |
| WO | WO-2008/097378 A1 | 8/2008 |

OTHER PUBLICATIONS

"Windows Media Player Object Model Version 6.4 Properties", Internet Citation, Nov. 14, 2005 XP002353802, Retrieved from Internet: URL/http://msdn.microsoft.com/library/default.asp?url=/library/en-us/wmp6sdk/htm/windowsmediaplayercontrolmethods.asp> [retrieved Nov. 14, 2005].

Primary Examiner — Kamran Afshar
Assistant Examiner — Neda Behrooz
(74) Attorney, Agent, or Firm — Birch, Stewart, Kolasch & Birch, LLP

(57) ABSTRACT

A mobile terminal and a method for playing at least one multimedia object are disclosed. The method for playing multimedia objects comprises synchronizing at least one attribute value of the at least one multimedia object with an attribute value of a multimedia player module provided in the mobile terminal; and playing the at least one multimedia object in accordance with the synchronized at least one attribute value using the multimedia player module.

18 Claims, 7 Drawing Sheets

MOBILE TERMINAL AND METHOD FOR PLAYING MULTIMEDIA OBJECTS

CROSS-REFERENCE TO RELATED APPLICATIONS

Pursuant to 35 U.S.C. §119(a), this application claims the benefit of earlier filing date and right of priority to Korean Application No. 10-2008-0084372, filed on Aug. 28, 2008, the contents of which are hereby incorporated by reference herein in their entirety.

FIELD OF THE INVENTION

The present invention relates to a terminal for mobile communication and a method for playing multimedia objects, and more particularly to a terminal for mobile communication, which can play at least one multimedia object included in a web page, and a method for playing the multimedia object.

DISCUSSION OF THE RELATED ART

Nowadays, remarkable development of communication technology has rapidly accelerated popularization of a mobile terminal (portable machine). Most of people always have a mobile terminal for communication, such as cellular phone and PDA. With the development of communication technology and increase of users, in addition a voice communication service and a short message service, more various services (for example, game, wireless Internet, etc.) have been provided to such a mobile terminal for communication. Examples of a wireless Internet platform provided from a mobile terminal for communications include a wireless application protocol (WAP), Mobile Explore of Microsoft corporation, and I-mode of NTT. Generally, the WAP is used.

The WAP is a protocol generated by network technology, wireless data technology, and rapid development of Internet, and is currently used as the most powerful platform in mobile wireless Internet. The mobile terminal for communication has limited performance (CPU, memory, display, transmission speed, etc.) in view of its feature. The WAP is properly defined to conform to the feature of the mobile terminal for communication, and has been designed to support various data services and Internet access. Also, the mobile terminal for communication includes different kinds of hardware in accordance with its type, and has a browser to allow a user to use a wireless Internet service.

The Internet service provided from the browser built in the mobile terminal is very restrictive due to limitation of hardware as compared with an Internet service provided from a browser built in a personal computer. Also, since different kinds of hardware included in mobile terminals for communication have different kinds of performance, a browser built in a mobile terminal for communication having low hardware performance has no choice but to provide a more limited service. For these reasons, a web page in which a mobile terminal for communication can receive a service has been limited to a specific web page which provides optimized multimedia contents.

However, as consumer's desire increases in accordance with recent development of software/hardware and communication technology, a mobile terminal for communication that can allow Internet access in a general web page has been developed. Also, a research of a mobile terminal for communication that can play a multimedia object included in a web page in the same manner as a personal computer is ongoing.

SUMMARY OF THE INVENTION

An Internet web page includes various multimedia objects such as audio and video, wherein the multimedia objects have various types such as ActiveX player object and Flash player object. The multimedia object has at least one or more object attribute values set in HTML language in connection with its play. For example, if a user accesses an Internet web page using a personal computer, a browser built in the computer extracts various attribute values related to play of a multimedia object by translating HTML language of the web page. Then, the computer plays background music in accordance with the attribute values while displaying the web page or plays moving picture in a specific region on the web page.

However, a multimedia player module built in a mobile terminal for communication that can allow Internet access currently uses attribute values different from the multimedia object in the web page. For this reason, the multimedia player module of the mobile terminal for communication cannot reflect unique play related set values set with respect to the multimedia object of the web page during play. As a result, the attribute values set with respect to the multimedia object on the web page are disregarded, and a default value included in the multimedia player module of the mobile terminal for communication is generally used. For example, if a user accesses a web page, which is established to automatically play background music, using a mobile terminal for communication, the user can view text, photo, etc. on the web page but cannot listen to background music. Moreover, if the multimedia player module of the mobile terminal for communication does not have a codec with respect to the multimedia object on the web page, a problem occurs in that play is not possible.

Accordingly, the present invention is directed to a mobile terminal and a method for playing multimedia objects, which substantially obviate one or more problems due to limitations and disadvantages of the related art.

An object of the present invention is to provide a mobile terminal and a method for playing multimedia objects, in which multimedia objects can be played in accordance with attribute values.

Another object of the present invention is to provide a mobile terminal and a method for playing multimedia objects, in which a user can display multimedia objects while viewing another part of a web page.

Other object of the present invention is to provide a mobile terminal and a method for playing multimedia objects, in which multimedia objects can be played by moving to a region corresponding to a progress bar.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal that can access the Internet includes a display to display a web page which a user accesses via the mobile terminal; a multimedia player module to play at least one multimedia object included in the web page; and a controller to synchronize at least one attribute value of the at least one multimedia object included in the web page with an attribute value of the multimedia player module. The multimedia player module plays the multimedia objects in accordance with the attribute value synchronized by the controller.

In another aspect of the present invention, a method for playing at least one multimedia object included in a web page which a user accesses via a mobile terminal that can access Internet includes synchronizing at least one attribute value of the at least one multimedia object with an attribute value of a multimedia player module provided in the mobile terminal; and playing the at least one multimedia object in accordance with the synchronized at least one attribute value using the multimedia player module.

The mobile terminal means a machine, mechanism, apparatus that can transmit and receive a radio signal to and from at least one of a base station, an external terminal, and a server on a mobile communication network. Preferably, examples of the mobile terminal include, but are not limited to, cellular phones, smart phones, personal digital assistants (PDA), portable multimedia players (PMP), and navigators.

The multimedia objects mean various types of dynamic information contents provided to a user through Internet. The multimedia objects can be used as various terms such as multimedia, contents, entities, and objects, and thus are not limited to specific terms. Examples of the multimedia objects include dynamic text, audio, dynamic graphic, animation, video or their combination. The multimedia objects are generally linked to a web page and then provided to a user. Types of the multimedia objects include ActiveX player object, Flash player object, etc. The multimedia objects included in the web page can automatically be played in accordance with set attribute values or can be played by a user.

The attribute values of the multimedia objects mean values/contents basically set in connection with play of the multimedia objects. The attribute values are generally prepared in HTML language. The attribute values include values/contents related to play of the multimedia objects without limitation. However, the attribute values preferably include 'whether to automatically implement the multimedia objects', 'the number of repetition times', 'volume information', 'object size', etc. Formats or contents of the attributes can be varied depending on types of the multimedia objects, codec mode, or types of the multimedia player.

Herein, synchronization means that at least one of the attribute values of the multimedia objects is correspondingly converted to an attribute value used by the multimedia player module of the mobile terminal. Namely, at least one of the attribute values of the multimedia objects which use different formats, contents, etc. is converted to a format, content, etc. that can be recognized by the multimedia player module.

Synchronization can be implemented using various software or hardware modes known in the art. For example, synchronization can be performed by the steps of extracting at least one attribute value of the multimedia objects from the web page and converting the extracted at least one attribute value to a corresponding attribute value of the multimedia player module. The conversion can be implemented easily using an attribute value mapping table. However, the conversion is not limited to the above example but can be implemented variously. Also, synchronization can be performed by a controller of the mobile terminal but is not limited to the controller. For example, synchronization can be performed by the multimedia player module of the mobile terminal.

Synchronization used herein is a terminology optionally defined to represent technical spirits of the present invention well, and can be modified to various terminologies, which can be recognized by those skilled in the art, in accordance with the aforementioned technology. For example, synchronization may be replaced with, but is not limited to, terminologies such as matching, mapping, conversion, sync, correspondence, etc.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
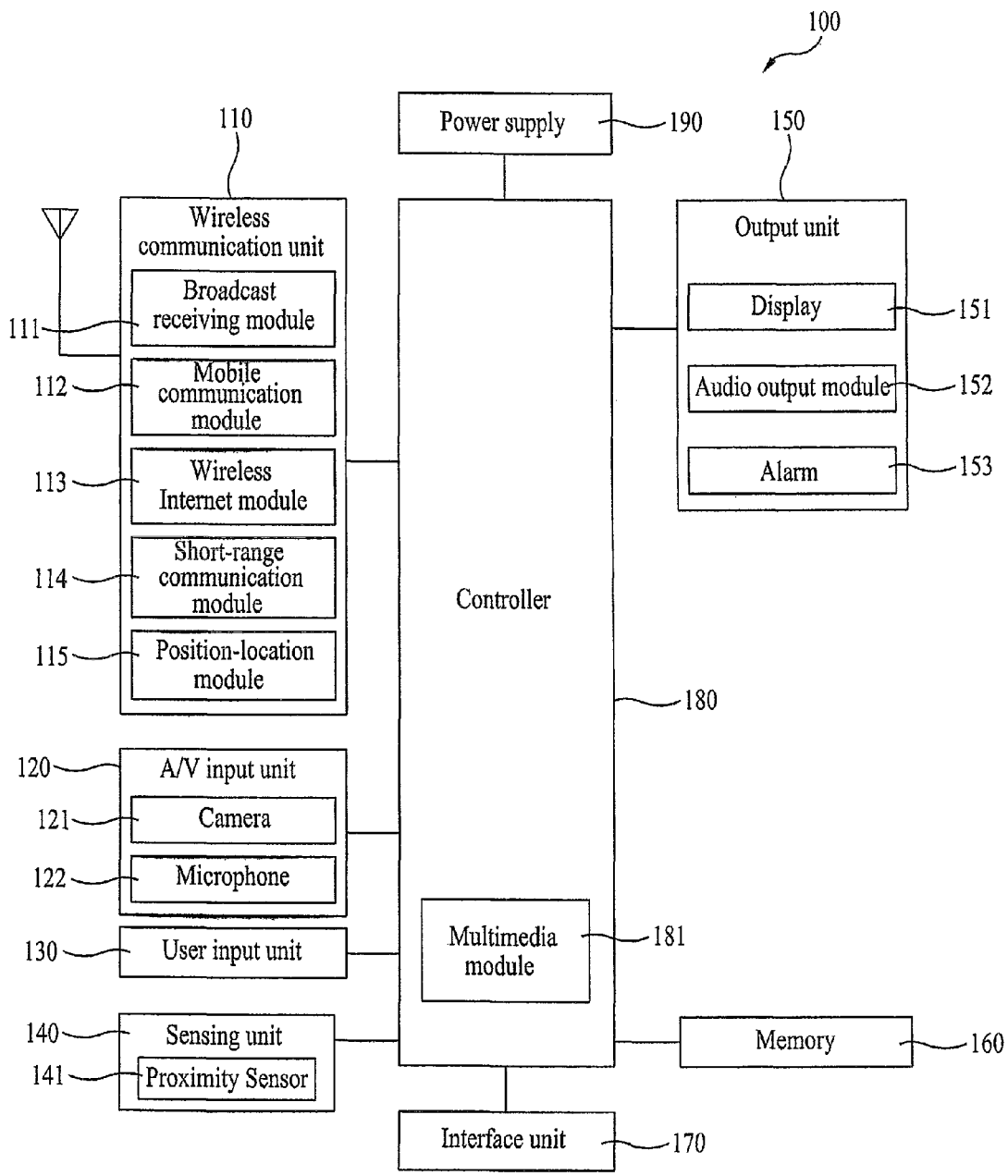
FIG. 1 is a general block diagram of a mobile terminal in accordance with an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal.

Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
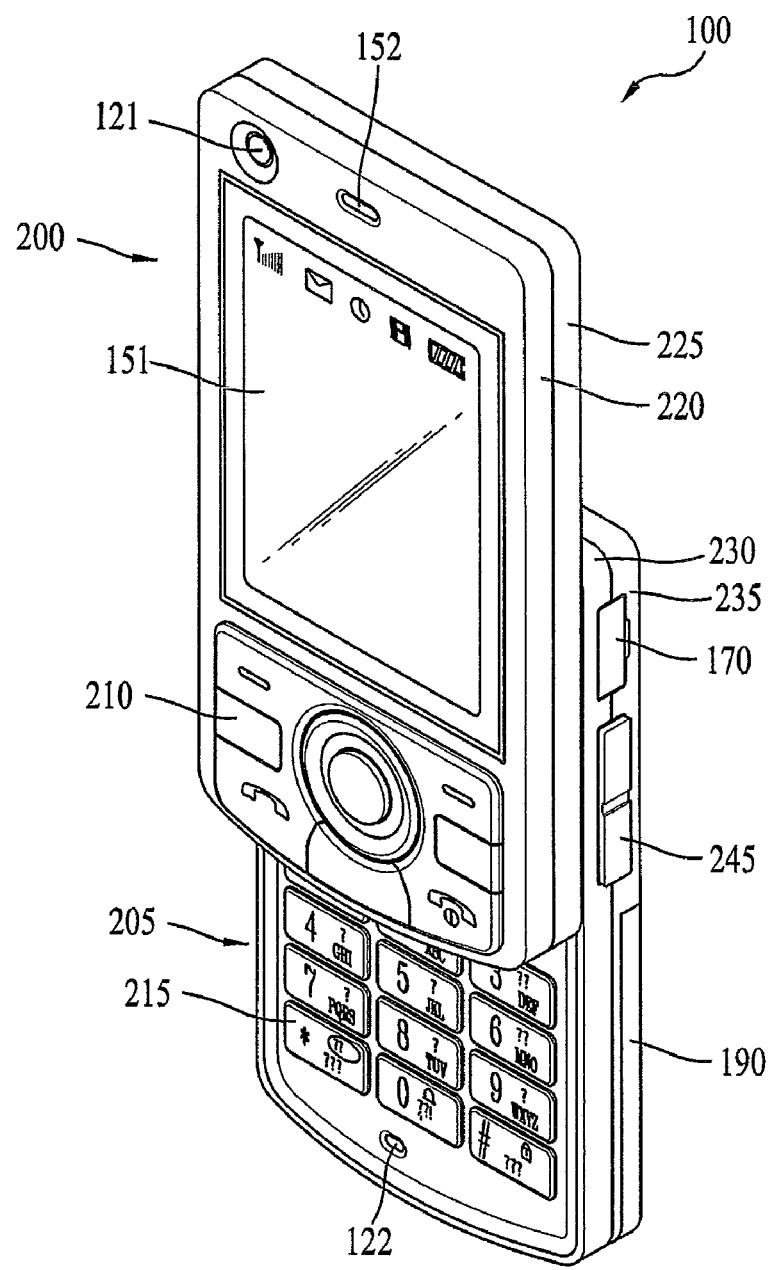
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably rigid material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
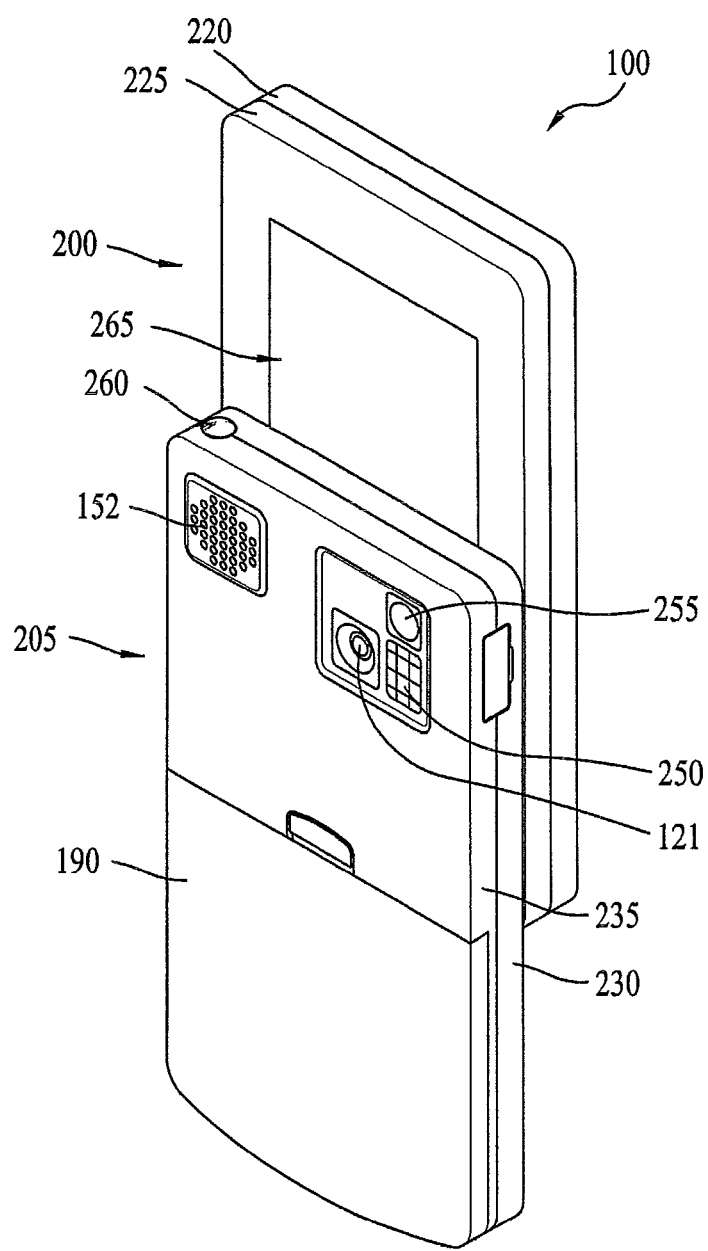
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
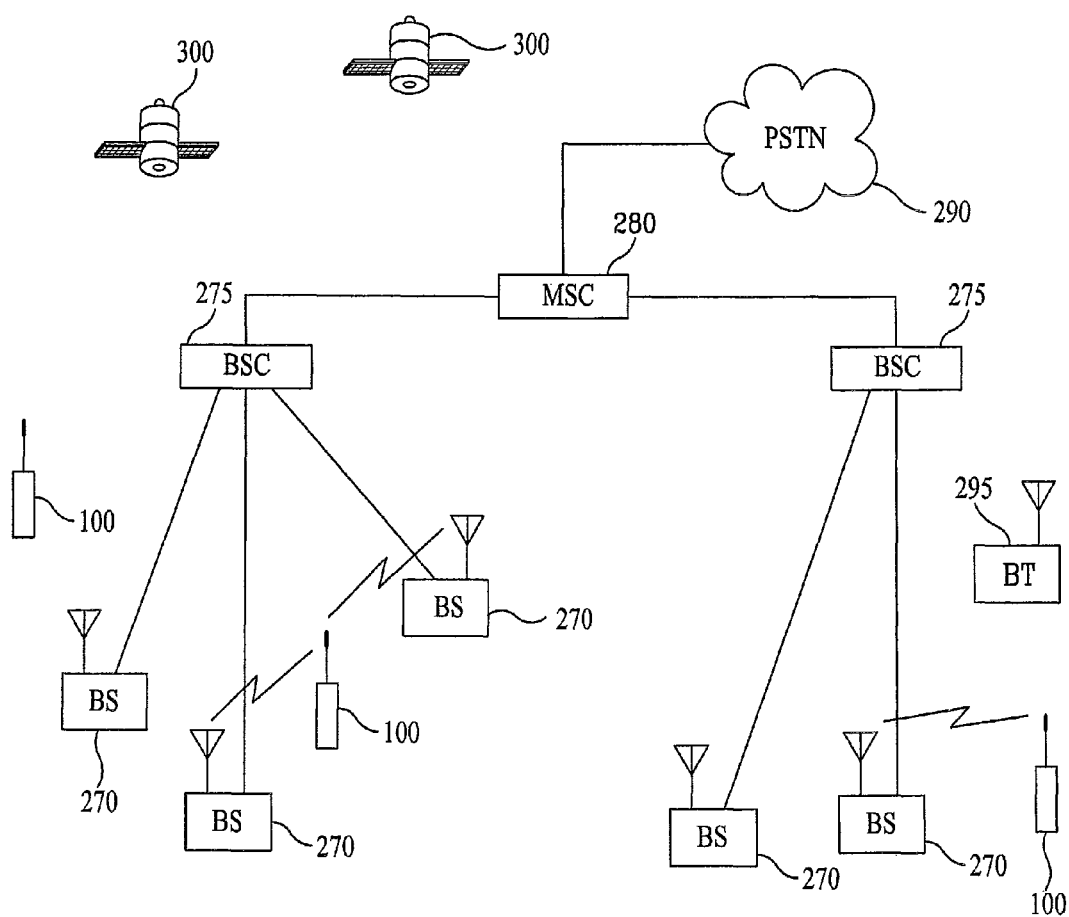
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A broadcasting transmitter 295 is shown broadcasting to portable terminals 100 operating within the system. The broadcast receiving module 111 (FIG. 1) of the portable terminal is typically configured to receive broadcast signals transmitted by the broadcasting transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station.

The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

Figure 5:
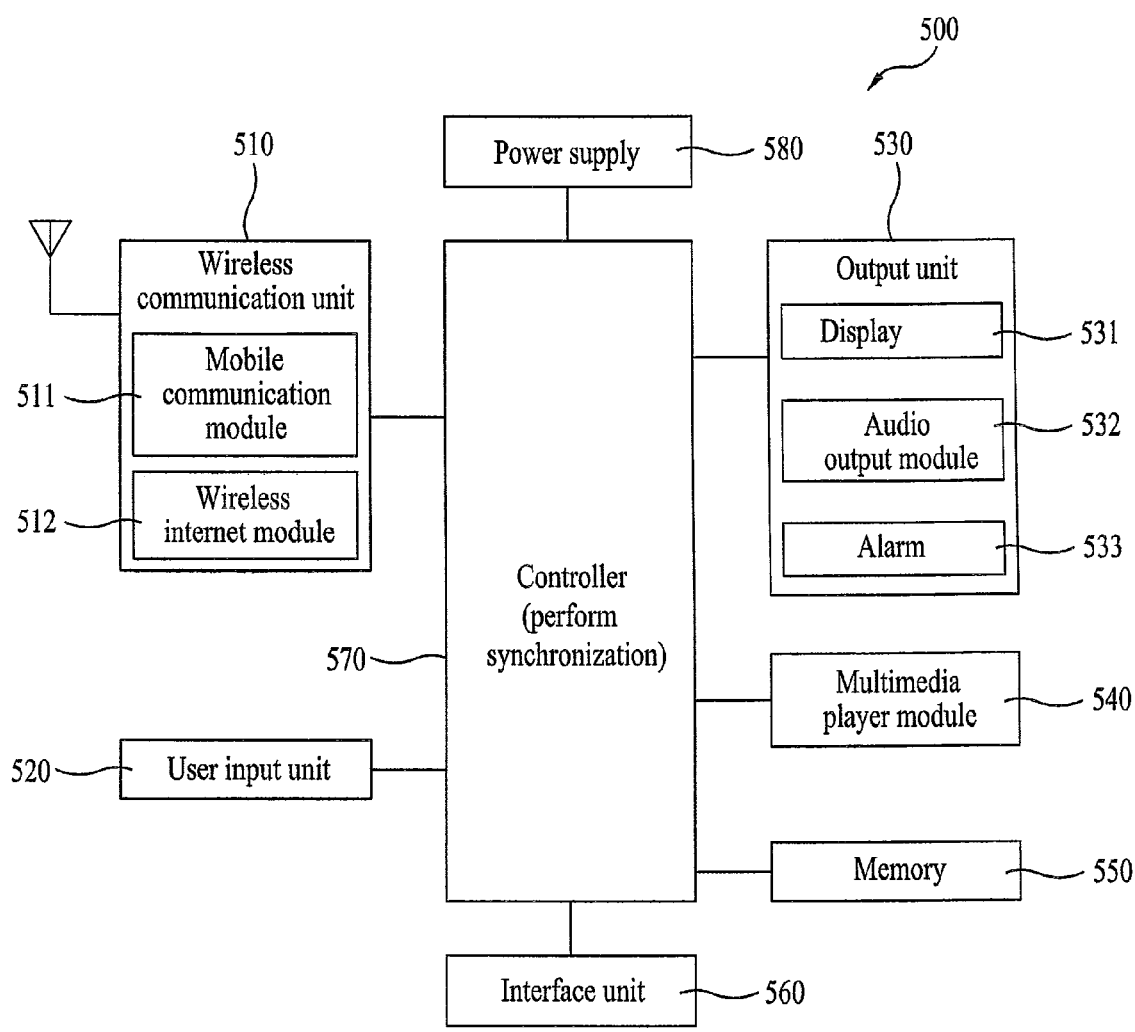
FIG. 5 is a detailed block diagram of a mobile terminal in accordance with an embodiment of the present invention.

FIG. 5 is a detailed block diagram of a mobile terminal according to an embodiment of the present invention, which allows Internet access.

The mobile terminal 500 includes a wireless communication unit 510, a user input unit 520, an output unit 530, a multimedia player module 540, a memory 550, an interface unit 560, a controller 570, and a power supply 580. FIG. 5 illustrates a mobile terminal having various elements. However, the elements shown in FIG. 5 are not indispensable elements. The mobile terminal according to the embodiment of the present invention may be implemented by elements more than or less than the elements shown in FIG. 5. Since most of the elements shown in FIG. 5 are identical with those shown in FIG. 1, their detailed description will be omitted excluding additional description related to the embodiment of the present invention.

If the mobile terminal 500 accesses a predetermined web page which includes multimedia objects, the controller 570 parses and analyzes HTML tag for the web page to obtain various kinds of information including attribute values of the multimedia objects. The information can be stored in the memory 550 for later procedure.

Also, the controller 570 can synchronize at least one of the attribute values of the multimedia objects with an attribute value of the multimedia player module 540 of the mobile terminal 500. The attribute values of the multimedia objects include, but are not limited to, 'whether to automatically implement the multimedia objects', 'the number of repetition times', 'volume information', etc. The attribute value can be modified by synchronization to a type that can be recognized by the multimedia player module 540 of the mobile terminal. The multimedia player module 540 may be a hardware module or a software module.

If the attribute value 'whether to automatically implement the multimedia objects' of the multimedia objects is 'automatic implementation', the multimedia objects can be implemented automatically by the multimedia player module 540. Also, if the attribute value 'whether to automatically implement the multimedia objects' of the multimedia objects is 'not automatic implementation', the multimedia objects cannot be implemented automatically by the multimedia player module 540. Also, the attribute value 'the number of repetition times' or 'volume information' of the multimedia objects can be mapped with the attribute value 'the number of repetition times' or 'volume information' of the multimedia player module 540. In this case, mapping refers to the attribute values of the multimedia objects corresponding to an attribute values that can be recognized by the multimedia player module. The respective attribute values can have 'one-to-one' correspondence or 'multi-to-one' correspondence. For example, the volume information attribute value 0~12.5% of the multimedia objects can be mapped with the attribute value 7 of the multimedia player module 540.

The synchronization can be performed using a mapping table, for example. Table 1 illustrates an example of the mapping table.

TABLE 1

| attributes of multimedia objects | attributes of multimedia objects | attributes of multimedia player module of mobile terminal |
|---|---|---|
| Whether to automatically implement multimedia objects | True or False | N/A |
| The number of repetition times | True (infinite), False (one time), number (n times) | 0 (infinite) number (n times) |
| Volume information | 0%~100% (0: maximum volume) | 0~7 (0: minimum volume) ☐ each number can be mapped to correspond to 12.5% period |

The attribute values illustrated in Table 1 are exemplary, and are varied depending on types of the multimedia objects and types of the mobile terminal 500. Accordingly, mapping of the attribute values for synchronization is not limited to Table 1, and those skilled in the art can designate mapping in various modes based on the examples of Table 1. The synchronization is generally performed by the controller 570. However, the synchronization may be performed by another module as the case may be. For example, the synchronization may be performed by the multimedia player module 540.

Furthermore, the controller 570 can determine whether the multimedia objects can be played (or reproduced) by the multimedia player module 540 of the mobile terminal 500 using codec information of the multimedia objects, extension word, etc. For example, if the multimedia objects are different from the objects supported by the multimedia player module 540, the objects cannot be played (or reproduced). Specifically, if the multimedia objects is ActiveX player objects but the multimedia player module 540 supports only Flash flayer objects, or vice versa, the objects cannot be played.

Furthermore, if the multimedia objects are different from codec, extension word, etc. supported by the multimedia player module 540, the objects cannot be played. Specifically, video/audio codec generally used for the multimedia objects of the web page is within the broad range, but video/audio codec supported by the mobile terminal 500 is very restrictive due to software or hardware limitation. Examples of the video codec used for the multimedia objects include, but are not limited to, MPEG1, MPEG2, MPEG4, MPEG4 AVC, DivX, Xvid, WMV7, WMV8, WMV9, etc. Examples of the audio codec used for the multimedia objects include, but are not limited to, MP3, AC3, AAC, AAC+, QCELP, EVRC, FLAC, WMA, etc. On the other hand, examples of the video codec that can be used for the mobile terminal 500 include MPEG4, MPEG4 AVC, etc., and examples of the audio codec for the mobile terminal 500 include MP3, AAC, AAC+, QCELP, EVRC, etc. Examples of the video extension word used for the multimedia objects include asf, wmv, avi, k3g, 3g2, 3gp, skm, mp4, mpg, mov, flv, etc. Example of the audio extension word used for the multimedia objects include mp3, kmp, kpp, kcp, ogg, m4a, wma, qcp, mid, etc. On the other hand, examples of the video extension word that can be used for the mobile terminal 500 include k3g, skm, etc., and examples of the audio extension word for the mobile terminal 500 include mp3, kmp, kpp, kcp, etc.

In accordance with the determined result, the controller 570 can directly play the multimedia objects from the multimedia player module 540 or can request a conversion server to convert the multimedia objects to an object type that can be played by the multimedia player module 540 by transferring a link address of the multimedia objects to the base station through the wireless Internet module 512. The conversion server is managed in various modes.

Furthermore, the controller 570 can command the multimedia player module 540 to play the multimedia objects included in the web page in accordance with the at least synchronized attribute value. Moreover, the controller 570 can play the multimedia objects in real time, or can play the multimedia objects after temporarily storing them in the memory. This play option can be set by the user, or can automatically be set considering a data rate according to communication with the base station.

Furthermore, if a predetermined part of a progress bar included in a multimedia object region on the web page is selected by the user, the controller 570 can allow the multimedia objects to be played from the selected part. Specifically, if the multimedia objects can be played by the mobile terminal 500, the controller 570 can command the multimedia player module 540 to move to the multimedia objects part corresponding to the selected part, thereby playing the multimedia objects. Also, if the multimedia objects cannot be played by the mobile terminal 500, the controller 570 can request the base station to convert objects type from the multimedia objects part corresponding to the selected part.

The progress bar means an interface that allows random or nonlinear access to the multimedia objects, and its type is not limited to a bar type. The progress bar can have a random shape including a button type, a circle type, an oval type, and an arrow type, in addition to a general bar type interface. Also, if the multimedia objects are video, the progress bar may be a collection of preview screens corresponding to a predetermined time zone.

Furthermore, if the multimedia objects include video data, the controller 570 can allow the multimedia player module to play the video data in the multimedia object region on the web page. This can easily be performed by resizing of the multimedia objects. Resizing of the multimedia objects can easily be performed using the known method such as down sampling. Also, if the multimedia objects include audio data, the controller 570 can control the multimedia player module 540 to play the audio data as background while displaying the current web page in the display.

The multimedia player module 540 plays the multimedia objects included in the web page in accordance with command of the controller 570. If necessary, the multimedia player module 540 can serves to synchronize at least one of the attribute values of the multimedia objects with the attribute value of the multimedia player module 540 as described above. Also, although the multimedia player module 540 is illustrated in FIG. 5 as a separate module divided from the controller 570, the multimedia player module 540 may be included in the controller 570 as illustrated in FIG. 1.

The memory 550 may store an attribute value mapping table for synchronization. As described above, the attribute value of the multimedia objects and the attribute value of the multimedia player module 540 can be varied depending on the object types and the mobile terminal 500. Accordingly, in order to map or correspond the attribute values to various object types or the mobile terminal 500, the memory 550 can have at least one mapping table prepared by various combinations. Also, the memory 550 may have a buffer for resizing or temporarily storing the multimedia objects.

Figure 6:
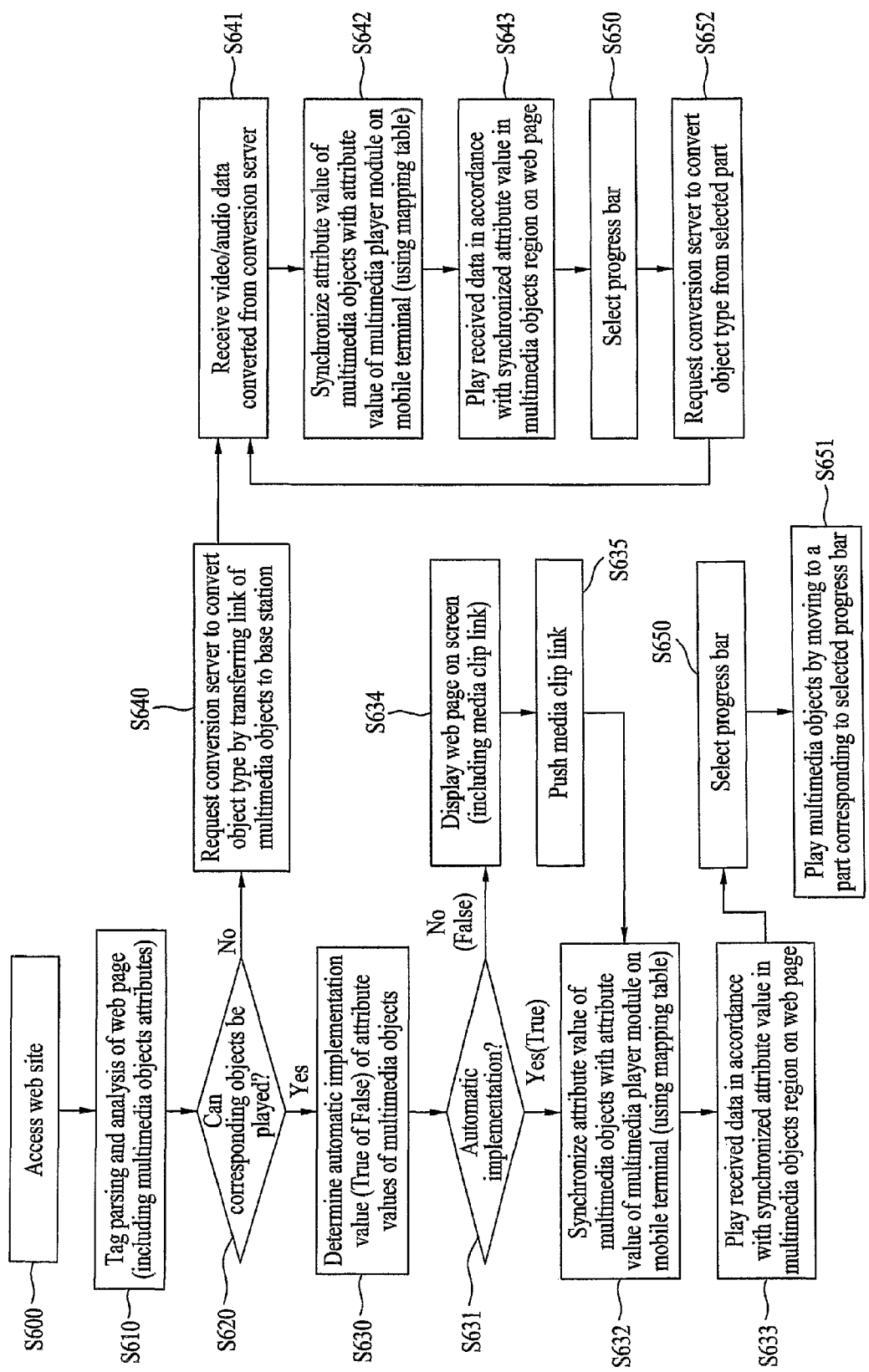
FIG. 6 is a diagram illustrating a method for playing multimedia objects according to an embodiment of the present invention.

FIG. 6 is a diagram illustrating a method for playing multimedia objects according to an embodiment of the present invention. Although all steps are illustrated in accordance with a predetermined order, their order may be modified optionally, and the respective steps can be combined or omitted in accordance with technical spirits of the present invention.

After accessing a predetermined web page, which includes multimedia objects, through a browser for Internet access (S600), the mobile terminal performs tag parsing and analysis for the web page to obtain web page information and attribute values of the multimedia objects (S610). Afterwards, the mobile terminal determines whether the objects can be played by the multimedia player module using extension word or codec information of the multimedia objects (S620).

If the multimedia objects can be played by the multimedia player module, the mobile terminal determines whether an automatic implementation value of the attribute values is 'automatic implementation (True)' or 'not automatic implementation (False)' (S630). If the automatic implementation value is 'True', the attribute values of the multimedia objects are synchronized with those of the multimedia player module (S632), and the received multimedia data are played in the multimedia objects region on the web page in accordance with the synchronized attribute values (S633). If the automatic implementation value is 'False', the accessed web page is displayed in the screen together with a media clip link (S634). If the media clip link is selected (S635), the synchronization and the multimedia data play are performed (S632 and S633).

If the multimedia objects cannot be played by the multimedia player module, their link is transferred to the conversion server of the base station to request conversion to object type that can be played by the multimedia player module (S640). Afterwards, the mobile terminal receives the converted multimedia data from the conversion server of (or via) the base station (S641). If the attribute values of the received multimedia data are synchronized with those of the multimedia player module (S642), and the received multimedia data are played in the multimedia objects region on the web page in accordance with the synchronized attribute values (S643).

If the progress bar is selected while the multimedia objects are being played (S650), the multimedia player module moves to the multimedia objects part corresponding to the selected part to play the multimedia objects (S651), or requests conversion of object type from the multimedia objects part corresponding to the selected part (S652).

Figure 7A:
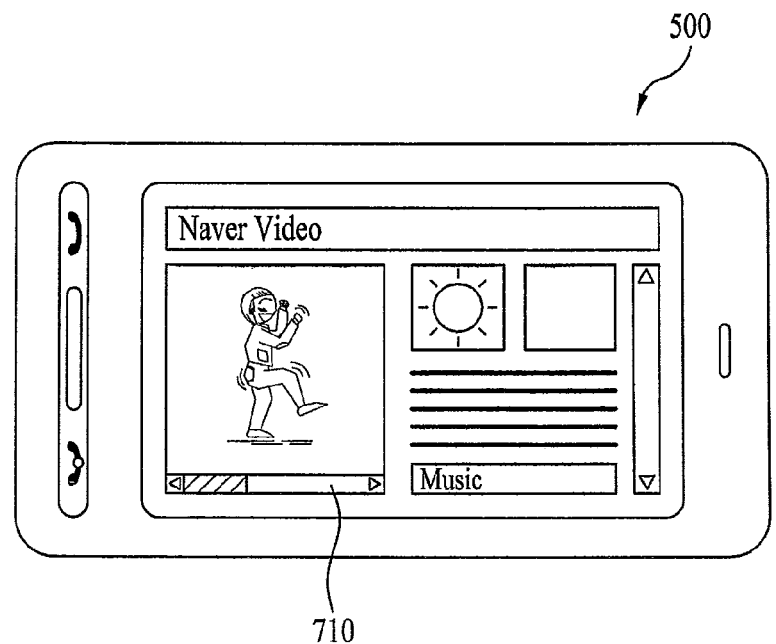
FIG. 7A and FIG. 7B are diagrams illustrating a mobile terminal according to an embodiment of the present invention, which plays multimedia objects included in a web site.
Figure 7B:
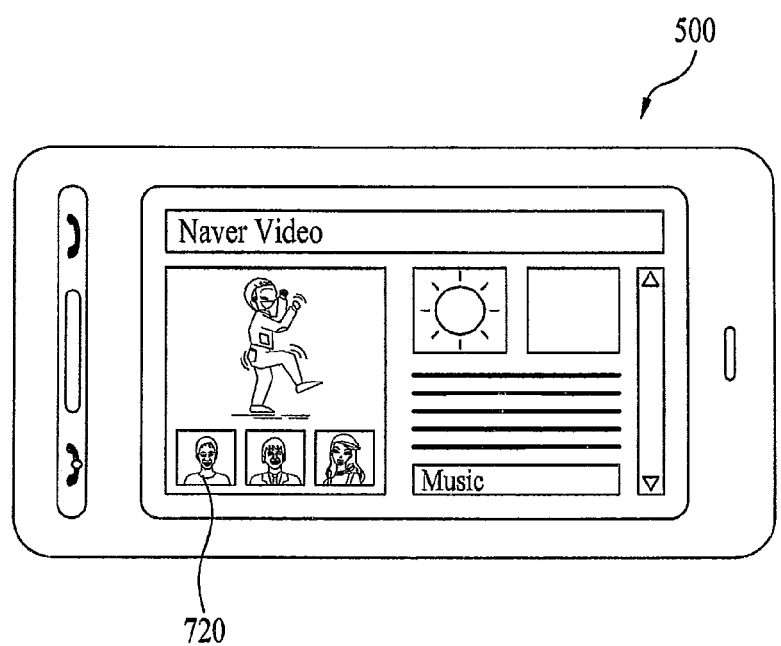

FIG. 7A and FIG. 7B are diagrams illustrating a mobile terminal according to an embodiment of the present invention, which plays multimedia objects included in a web site.

If the multimedia objects are video data, the video is played in the multimedia objects region on the web page as illustrated in FIG. 7A and FIG. 7B and the audio is played as background. Also, if the multimedia objects are audio data, the audio is played as background as above.

If the user selects a predetermined part as a progress bar 710 included in the multimedia objects region, the mobile terminal 500 plays the multimedia data from the selected part as the progress bar 710. Although the progress bar 710 have a bar type as illustrated in FIG. 7A, the progress bar 710 may be a collection 720 of preview screens corresponding to a predetermined time zone as illustrated in FIG. 7B. If the user selects any one of the preview screens, the mobile terminal 500 plays the multimedia data from the part corresponding to the selected preview screen.

Furthermore, according to the embodiment of the present invention, the aforementioned method can be implemented by a code in media where programs are recorded. The media include all types of recorders where data are stored. The aforementioned mobile terminal and the method for playing multimedia objects are not limited to the aforementioned embodiments. All or some of the embodiments can be combined selectively for various modifications.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless Internet module configured to wirelessly connect to the Internet;
a display configured to display a web page which a user accesses via the wireless Internet module;
a multimedia player module configured to play at least one multimedia object included in the web page; and a controller configured to synchronize at least one attribute value of the at least one multimedia object included in the web page with an attribute value of the multimedia player module by converting an attribute value of the multimedia object to the attribute value used by the multimedia player module, wherein, if the at least one multimedia object is an object type that cannot be played by the multimedia player module, the controller is configured to request a conversion server via a base station to convert the at least one multimedia object to an object type that can be played by the multimedia player module by transferring a link address of the at least one multimedia objects via the base station.

2. The mobile terminal as claimed in claim 1, wherein the multimedia player module is further configured to play the at least one multimedia object in accordance with the synchronized at least one attribute value.

3. The mobile terminal as claimed in claim 1, wherein, if the at least one attribute value of 'whether to automatically implement the at least one multimedia objects' for the at least one multimedia object is 'automatic implementation', the controller is configured to control the at least one multimedia object to be automatically implemented by the multimedia player module.

4. The mobile terminal as claimed in claim 1, wherein, if the at least one attribute value of 'whether to automatically implement the at least one multimedia object' for the at least one multimedia object is 'not automatic implementation', the controller is configured to control the at least one multimedia object so as not to be automatically implemented by the multimedia player module.

5. The mobile terminal as claimed in claim 1, wherein the controller is configured to map the at least one attribute value of 'the number of repetition times' for the at least one multimedia object with an attribute value of 'the number of repetition times' for the multimedia player module through the synchronization.

6. The mobile terminal as claimed in claim 1, wherein the controller is configured to map the at least one attribute value of 'volume information' of the at least one multimedia object with an attribute value of 'volume information' for the multimedia player module through the synchronization.

7. The mobile terminal as claimed in claim 1, wherein the multimedia player module is configured to play multimedia data received from the base station in accordance with the at least one attribute value synchronized by the controller.

8. The mobile terminal as claimed in claim 1, wherein, if a part of a progress bar included in a multimedia object region in the web page is selected by the user, the multimedia player module is configured to play the at least one multimedia object beginning with a part of the at least one multimedia object corresponding to the selected part.

9. The mobile terminal as claimed in claim 1, wherein, if a part of a progress bar included in a multimedia object region in the web page is selected by the user, the controller is configured to request the conversion server via the base station to convert the object type of the at least one multimedia object from a part of the at least one multimedia object corresponding to the selected part.

10. The mobile terminal as claimed in claim 1, wherein, if the at least one multimedia object includes video data, the multimedia player module is configured to play the video data in a multimedia object region in the web page.

11. A method for controlling a mobile terminal, the method comprising:

accessing the Internet;

displaying a web page which a user accesses via a wireless Internet module;

synchronizing at least one attribute value of at least one multimedia object with an attribute value of a multimedia player module provided in the mobile terminal by converting an attribute value of the multimedia object to the attribute value used by the multimedia player module; and playing the at least one multimedia object in accordance with the synchronized at least one attribute value using the multimedia player module;

if the at least one multimedia object is an object type that cannot be played by the multimedia player module, further comprising requesting a conversion server via a base station to convert the at least one multimedia object to an object type that can be played by the multimedia player module by transferring a link address of the at least one multimedia objects via the base station.

12. The method as claimed in claim 11, wherein, if the at least one attribute value of 'whether to automatically implement the at least one multimedia object' of the at least one multimedia object is 'automatic implementation', the at least one multimedia object is automatically implemented by the multimedia player module.

13. The method as claimed in claim 11, wherein, if the at least one attribute value of 'whether to automatically implement the at least one multimedia object' of the at least one multimedia object is 'not automatic implementation', the at least one multimedia object is not automatically implemented by the multimedia player module.

14. The method as claimed in claim 11, wherein the step of synchronizing the at least one attribute value includes mapping an attribute value of 'the number of repetition times' for the multimedia objects with an attribute value of 'the number of repetition times' for the multimedia player module.

15. The method as claimed in claim 11, wherein the step of synchronizing the at least one of attribute value includes mapping an attribute value of 'volume information' for the multimedia objects with an attribute value of 'volume information' for the multimedia player module.

16. The method as claimed in claim 11, wherein the multimedia player module plays multimedia data received from the base station in accordance with the at least one synchronized attribute value.

17. The method as claimed in claim 11, wherein, if a part of a progress bar included in a multimedia object region in the web page is selected by the user, the multimedia player module plays the at least one multimedia object beginning with a part of the at least one multimedia object corresponding to the selected part.

18. The method as claimed in claim 11, wherein, if the at least one multimedia object includes video data, the multimedia player module plays the video data in a multimedia object region in the web page.

* * * * *